(12) United States Patent
Arimilli et al.

(10) Patent No.: US 7,844,746 B2
(45) Date of Patent: Nov. 30, 2010

(54) ACCESSING AN EFFECTIVE ADDRESS AND DETERMINING WHETHER THE EFFECTIVE ADDRESS IS ASSOCIATED WITH REMOTELY COUPLED I/O ADAPTERS

(75) Inventors: Ravi K. Arimilli, Austin, TX (US); Claude Basso, Raleigh, NC (US); Jean L. Calvignac, Raleigh, NC (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 12/024,695

(22) Filed: Feb. 1, 2008

(65) Prior Publication Data

US 2009/0198837 A1 Aug. 6, 2009

(51) Int. Cl.
*G06F 3/12* (2006.01)
(52) U.S. Cl. .................. 710/5; 710/2; 710/8; 710/305; 709/220; 709/250; 709/251; 711/6; 711/202; 711/209; 358/1.15
(58) Field of Classification Search .............. 710/2, 710/5, 8, 305; 709/250, 220, 251; 711/6, 711/202; 358/1.15
See application file for complete search history.

(56) References Cited

U.S. PATENT DOCUMENTS

| | | | | |
|---|---|---|---|---|
| 4,204,113 A | * | 5/1980 | Giraud et al. | 235/375 |
| 5,016,169 A | * | 5/1991 | Koya et al. | 711/203 |
| 5,706,434 A | * | 1/1998 | Kremen et al. | 709/218 |
| 6,446,185 B2 | * | 9/2002 | Hagersten | 711/202 |
| 6,574,721 B1 | * | 6/2003 | Christenson et al. | 711/209 |
| 6,668,299 B1 | * | 12/2003 | Kagan et al. | 710/305 |
| 7,213,081 B2 | * | 5/2007 | Narasimhamurthy et al. | 710/2 |
| 7,447,867 B2 | * | 11/2008 | Soja et al. | 711/202 |
| 7,533,238 B2 | * | 5/2009 | Burns et al. | 711/172 |
| 2004/0098447 A1 | | 5/2004 | Verbeke et al. | |
| 2007/0033592 A1 | | 2/2007 | Roediger et al. | |
| 2009/0153897 A1 | * | 6/2009 | Blackmore et al. | 358/1.15 |

FOREIGN PATENT DOCUMENTS

WO    WO 98/32077    7/1998

OTHER PUBLICATIONS

U.S. Appl. No. 11/958,668, Image File Wrapper printed Jun. 10, 2010, 1 page.
U.S. Appl. No. 12/024,220, Image File Wrapper printed Jun. 10, 2010, 1 page.

* cited by examiner

*Primary Examiner*—Tammara Peyton
(74) *Attorney, Agent, or Firm*—Stephen R. Tkacs; Stephen J. Walder, Jr.; Diana R. Gerhardt (57) ABSTRACT

A heterogeneous processing element model is provided where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model abstracts an I/O device such that communication intended for the I/O device may be packetized and sent over a network. Thus, a virtualization platform may packetize communication intended for a remotely located I/O device and transmit the packetized communication over a distance, rather than having to make a call to a library, call a device driver, pin memory, and so forth.

20 Claims, 5 Drawing Sheets

ACCESSING AN EFFECTIVE ADDRESS AND DETERMINING WHETHER THE EFFECTIVE ADDRESS IS ASSOCIATED WITH REMOTELY COUPLED I/O ADAPTERS

This invention was made with United States Government support under Agreement No. HR0011-07-9-0002 awarded by DARPA. THE GOVERNMENT HAS CERTAIN RIGHTS IN THE INVENTION.

BACKGROUND

1. Technical Field

The present application relates generally to an improved data processing system and method. More specifically, the present application is directed to heterogeneous processing elements.

2. Description of Related Art

Figure 1:
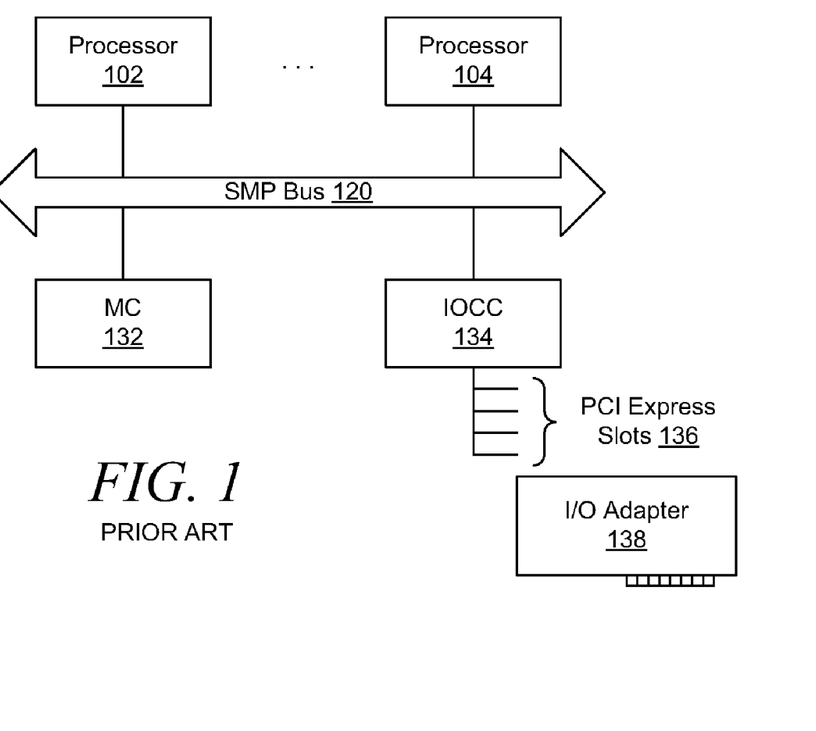
FIG. 1 is a block diagram illustrating a typical multiple processor data processing system.

Input/output, or I/O, refers to the transfer of data between a processor and a peripheral device in a data processing system. Every transfer is an output from one device and an input to another device. FIG. 1 is a block diagram illustrating a typical multiple processor data processing system. In the depicted example, data processing system 100 has a plurality of processors 102, 104 connected via a symmetric multiprocessing (SMP) bus 120. Memory controller (MC) 132 and input/output channel controller (IOCC) 134 also connect to SMP bus 120

In the example shown in FIG. 1, IOCC 134 connects to a plurality of expansion slots, such as peripheral component interconnect express (PCI Express or PCIe) slots 136. One or more I/O adapter 138 may connect to PCI Express slots 136.

Figure 2:
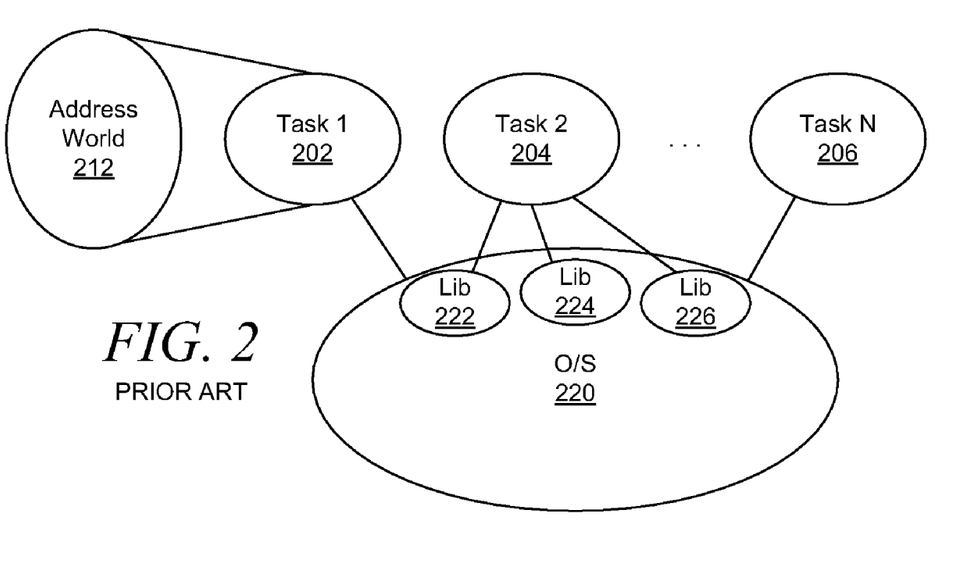
FIG. 2 illustrates a typical software environment for a data processing system.

FIG. 2 illustrates a typical software environment for a data processing system, such as data processing system 100 in FIG. 1. A plurality of tasks 1-N 202, 204, 206 run under control of operating system 220. A task 202, 204, 206 may be a process running on a processor, for example. Each task has an assigned address space. For example, operating system 220 assigns task 1 202 an address space 212 that comprises a range of effective addresses, which may also be referred to as virtual addresses. Each task 202, 204, 206 has an address space, or address space, from which and to which it may read and write. The operating system 220 translates the effective addresses to real addresses, which may exist in memory or may be expanded to persistent storage using a virtual memory manager.

Each time a task, such as task 2 204, attempts to access an I/O device, such as I/O adapter 138 in FIG. 1, task 204 must make a call to one of libraries 222, 224, 226. There are three main categories of I/O, including classic I/O, storage, and network I/O. Thus, these libraries may include a classic I/O library, a storage library, and a network library, for example. For instance, task 2 204 may access, or "touch," an I/O adapter by making a call to library 222. Each library may include sub-calls. For example, the network I/O library, such as library 222, may include transmission control protocol/Internet protocol (TCP/IP) calls, user datagram protocol/Internet protocol (UDP/IP) calls, etc.

Figure 3:
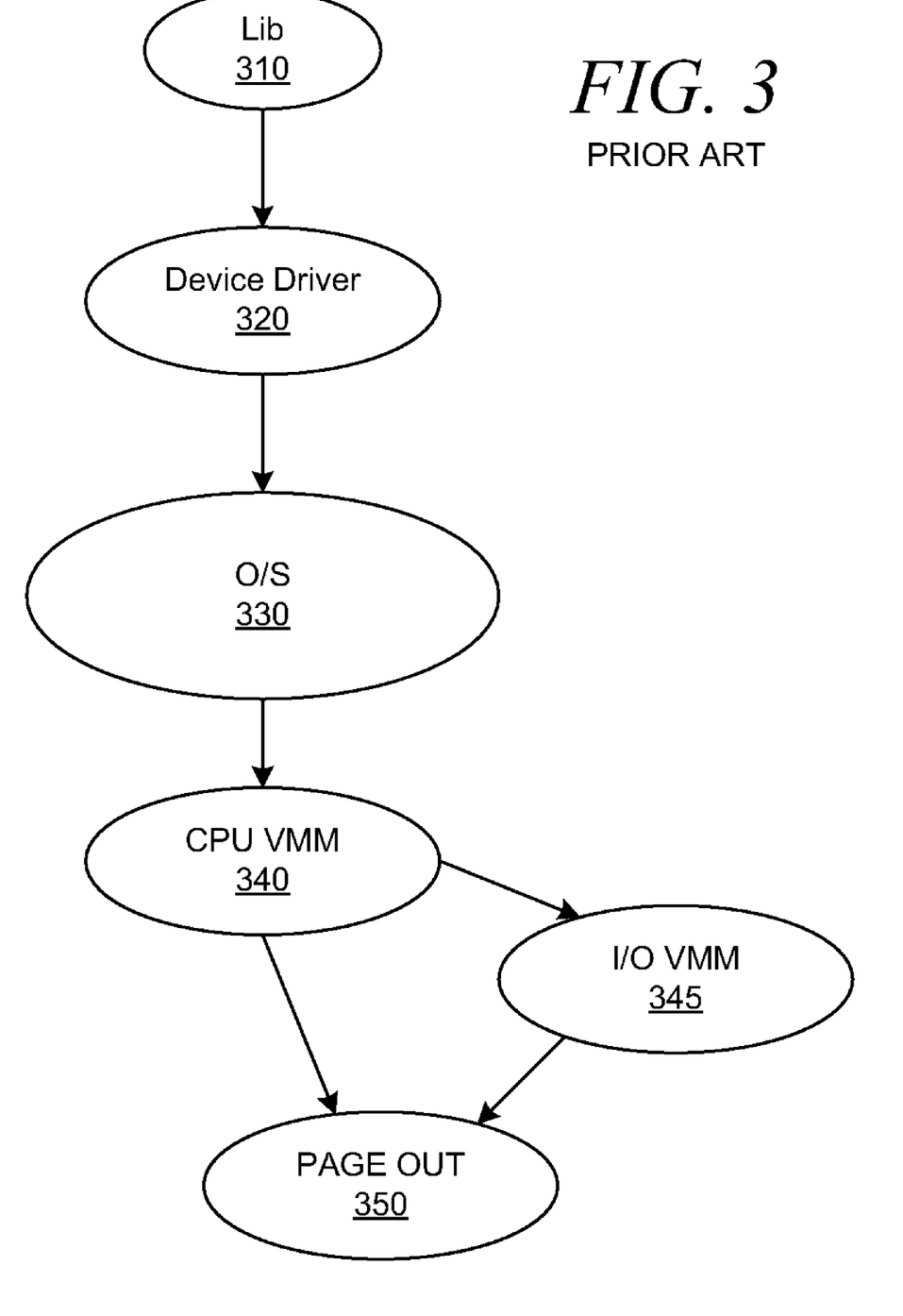
FIG. 3 illustrates a typical input/output access.

FIG. 3 illustrates a typical input/output access. A task makes a call to library 310, which accesses device driver 320 for the target I/O device. Device driver 320 then performs I/O reads (RD) and I/O writes (WR) to set up the device. Then, device driver 320 requests an amount of memory, such as 8 kB, from operating system (O/S) 330 to be "pinned" so device driver 320 can read and write into physical memory. O/S 330 then communicates with the central processing unit (CPU) virtual memory manager (VMM) 340 to deallocate the requested amount of memory. The CPU VMM 340 assigns an effective address range to the I/O VMM 345, and the CPU VMM 340 and I/O VMM 345 perform a page out operation 350 to pin the memory to the I/O device.

This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes.

As current trends continue, network I/O and storage I/O in particular are becoming more important than the processing elements. Yet, the model for setting up an I/O device and performing I/O reads and writes remains the same. The existing model is the pervasive world, and manufacturers are left to accept their lot in life.

SUMMARY

In one illustrative embodiment, a method, in a data processing system, communicates with a remotely located input/output device. The method comprises receiving, from a user level thread within a first data processing system, a request to access an effective address. The method comprises determining whether the effective address is associated with a remotely located input/output device. In response to the effective address being associated with a remotely located input/output device, the method packetizes the request and sends the packetized request over a network to the remotely located input/output device.

In another illustrative embodiment, a data processing system comprises a processor and a memory coupled to the processor. The memory comprises instructions which, when executed by the processor, cause the processor to receive, from a user level thread, a request to access an effective address. The instructions further cause the processor to determine whether the effective address is associated with a remotely located input/output device. In response to the effective address being associated with a remotely located input/output device, the instructions cause the processor to packetize the request and send the packetized request over a network to the remotely located input/output device.

In another illustrative embodiment, a computer program product comprises a computer readable storage medium having a computer readable program. The computer readable program, when executed on a computing device, causes the computing device to receive, from a user level thread, a request to access an effective address. The computer readable program causes the computing device to determine whether the effective address is associated with a remotely located input/output device. In response to the effective address being associated with a remotely located input/output device, the computer readable program causes the computing device to packetize the request and send the packetized request over a network to the remotely located input/output device.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 4:
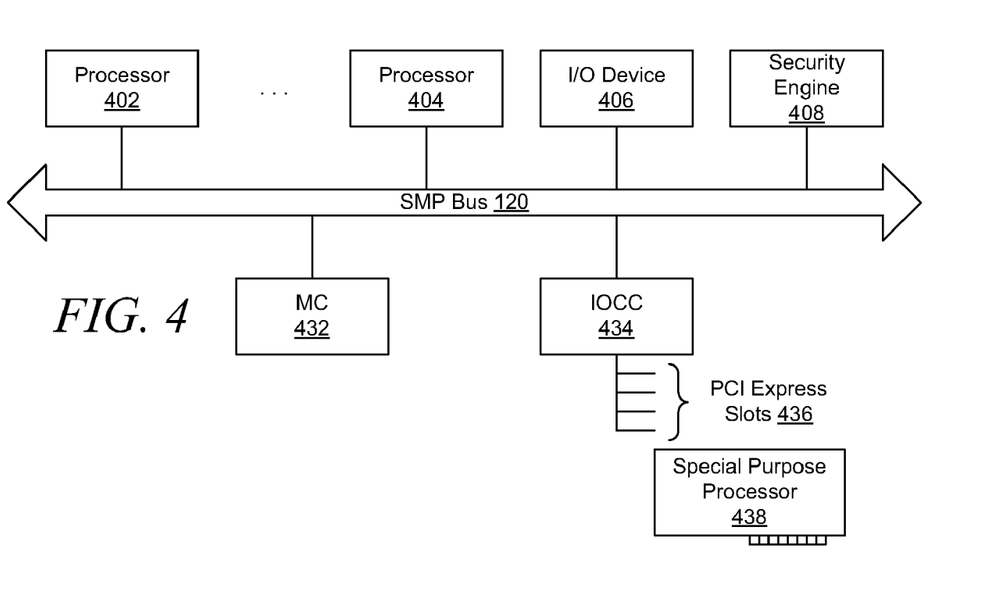
FIG. 4 is a block diagram of an exemplary data processing system in which aspects of the illustrative embodiments may be implemented.

With reference now to the figures and in particular with reference to FIG. 4, an exemplary diagram of data processing environments is provided in which illustrative embodiments of the present invention may be implemented. It should be appreciated that FIG. 4 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 4, a block diagram of an exemplary data processing system is shown in which aspects of the illustrative embodiments may be implemented. Data processing system 400 is an example of a computer. In the depicted example, data processing system 400 has a plurality of processors 402, 404 connected via a symmetric multiprocessing (SMP) bus 420. Memory controller (MC) 432 and input/output channel controller (IOCC) 434 also connect to SMP bus 420.

An operating system may run on processing units 402, 404. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing units 402, 404. Alternatively, a single processor system may be employed.

Instructions for the operating system, the object-oriented programming system, and applications or programs are located on storage devices, such as a hard disk drive, and may be loaded into main memory through memory controller 432 for execution by processing units 402, 404. The processes for illustrative embodiments of the present invention may be performed by processing units 402, 404 using computer usable program code, which may be located in a memory such as main memory (not shown), or in one or more peripheral devices, for example.

A bus system, such as SMP bus 420 as shown in FIG. 4, may be comprised of one or more buses. Of course, the bus system may be implemented using any type of communication fabric or architecture that provides for a transfer of data between different components or devices attached to the fabric or architecture. Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

In a typical software environment, a plurality of tasks runs under control of an operating system. A task may be a process running on a processor, such as a user level thread, for example. Each task has an assigned address space. Each task has an address space, or address space, from which and to which it may read and write. The operating system translates the effective addresses to real addresses, which may exist in memory or may be expanded to persistent storage using a virtual memory manager. A user level thread communicates with another user level thread by making an access request to an effective address.

Each time a task attempts to access an I/O device, the task must make a call to a library, which accesses the device driver for the target I/O device. The device driver then performs I/O reads and writes to set up the device. Then, the device driver requests an amount of memory, such as 8 kB, from the operating system to be "pinned" so the device can read and write into physical memory. This typical process is based on a model that has existed for a very long time. Processes running on processors are at the top of the hierarchy, while I/O devices are at the bottom of the hierarchy. Manufacturers of I/O devices accept that I/O devices are second-class citizens, and that a process must go through the conventional process of setting up an I/O device through an O/S library and a device driver to perform I/O reads and writes. As current trends continue, network I/O and storage I/O in particular are becoming more important than the processing elements. Yet, the model for setting up an I/O device and performing I/O reads and writes remains the same. The existing model is the pervasive world, and manufacturers are left to accept their lot in life.

In accordance with an illustrative embodiment, a heterogeneous processing element model is provided where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, power perspective, as the processors. The operating system can get work to a security engine, for example, in the same way it does to a processor.

In the illustrative embodiment, IOCC 434 connects to a plurality of expansion slots, such as peripheral component interconnect express (PCI Express or PCIe) slots 436. One or more special purpose processors 438 may connect to PCI Express slots 436. In the depicted example, special purpose processor 438 may be, for example, an I/O device, such as a local area network (LAN) adapter, a storage controller, a security engine, or the like. Thus, a heterogeneous processing element model is provided where I/O devices and other special purpose processing elements look and act like processors. In order to be treated like a processor, a special purpose processing element must follow some rules and have some characteristics of a processor, such as address translation, security, interrupt handling, and exception processing, for example.

Alternatively, in accordance with the illustrative embodiment, a special purpose processing element may connect to SMP bus 120 via a processor slot (not shown). Thus, I/O device 406 and security engine 408, for example, may look and act like a processor to the operating system, as long as I/O device 406 and security engine 408 obey the rules of a processor. The heterogeneous processing element model puts special purpose processing elements, such as I/O device 406, security engine 408, and special purpose processor 438, on the same playing field as processors, from a programming perspective, operating system perspective, power perspective, as the processors. The operating system can get work to a security engine, for example, in the same way it does to a processor.

This heterogeneous processing element model eliminates the need for a device driver for I/O devices, for instance. Each processing element is assigned an address space from which and to which it may read and write. The operating system may then bind a process to a processing element, whether the processing element is a conventional single core processor, a multiple core processor, an I/O adapter, a security engine, or some other type of processing element. Some processing elements will be better at certain types of work than others. For example, a security engine will be better at a cryptography task than a conventional processor.

Figure 5:
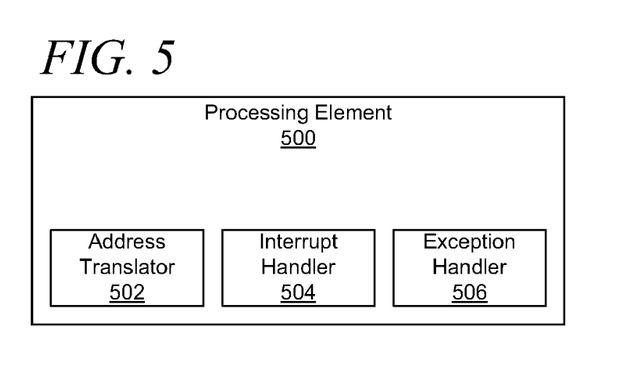
FIG. 5 is a block diagram of a processing element in accordance with an illustrative embodiment.

FIG. 5 is a block diagram of a processing element in accordance with an illustrative embodiment. As stated above, in order to be treated like a processor, a processing element must behave like a processor, meaning it must follow some rules and have some characteristics of a processor, such as address translation, security, interrupt handling, and exception processing, for example. Processing element 500 may be, for example, an I/O device, a security engine, a graphics processor, etc. Processing element 500 includes an address translator 502 to translate between effective addresses and real addresses.

In one exemplary embodiment, address translator 502 may be an effective-to-real address translation (ERAT) table. Known processor architectures specify a translation-lookaside buffer (TLB) and a segment-lookaside buffer (SLB) to translate from the effective address (EA) used by software and the real address (RA) used by hardware to locate instructions and data in storage. Since these translation mechanisms take several cycles, once translated, the EA, RA pair is stored in a two-way set-associative array, called the effective-to-real address translation (ERAT) table. For example, the POWER4™ architecture from IBM Corporation implements separate ERATs for instruction-cache (IERAT) and data-cache (DERAT) accesses. Both ERATs are indexed using the effective address. A common 1024-entry four-way set-associative TLB is implemented for each processor. Thus, in the exemplary embodiment, address translator 502 of processing element 500 may be a similar ERAT table to allow the processing element to easily translate between the effective address used by software and the real address used by hardware.

Processing element 500 also includes an interrupt handler 504. An interrupt is a signal that gets the attention of a processor and is usually generated when I/O is required. For example, hardware interrupts are generated when a key is pressed or when the mouse is moved. Software interrupts are generated by a program requiring disk input or output. As another example, an internal timer may continually interrupt the computer several times per second to keep the time of day current or for timesharing purposes. When an interrupt occurs, processing element 500 transfers control to the operating system, which determines the action to be taken. Thus, in order to be treated like a processor, a special purpose processing element, such as processing element 500, must have an interrupt handler 504 to take appropriate action when hardware or software requires the attention of processing element 500.

Processing element 500 also includes exception handler 506. Exception handling is a programming language construct or computer hardware mechanism designed to handle the occurrence of some condition that changes the normal flow of execution. The condition is called an exception. Exceptions are normally recommended to be used only for signaling error (exceptional) conditions. In general, current state will be saved in a predefined location and execution will switch to a predefined handler. Depending on the situation, the handler may later resume the execution at the original location, using the saved information to restore the original state. For example, an exception that will usually be resumed is a page fault, while a division by zero usually cannot be resolved transparently. From the processing point of view, hardware interrupts are similar to resumable exceptions, although they are usually not related to the current program flow. Thus, processing element 500 includes exception handler 506 to manage exception conditions that may change the normal flow of execution.

Thus, processing element 500 includes the necessary characteristics in order to be treated by a processor with respect to the operating environment of the data processing system. Whether processing element 500 exists in an expansion slot, such as PCI Express slots 436 in FIG. 4, or a processor slot, processing element 500 is treated like a processor by the operating system. In addition, processing element 500 must obey certain rules that processors must obey, particularly rules about security, for example. The operating system may then assign an address space from which and to which processing element 500 may read and write. The operating system may bind a process to processing element 500. Furthermore, other tasks may touch I/O, for instance, without the need for libraries and device drivers.

Figure 6:
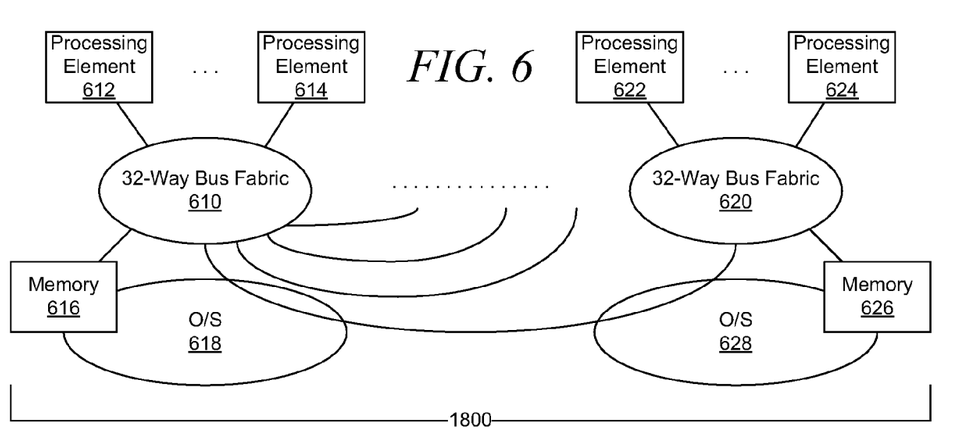
FIG. 6 is a diagram of a multi-tiered interconnect with a heterogeneous processing element model in accordance with an illustrative embodiment.

FIG. 6 is a diagram of a multi-tiered interconnect with a heterogeneous processing element model in accordance with an illustrative embodiment. A 32-way bus fabric 610 connects up to 32 processing elements 612-614 and memory 616. An operating system 618 runs on processing elements 612-614, assigns effective address ranges to processing elements 612-614, and may bind processes to processing elements 612-614.

In the depicted example, 32-way bus fabric 610 may be connected to up to 1800 such 32-way bus fabrics, such as 32-way bus fabric 620. The 32-way bus fabric 620 connects up to 32 processing elements 622-624 and memory 626. Operating system 628 runs on processing elements 622-624, assigns effective address ranges to processing elements 622-624, and may bind processes to processing elements 622-624. Thus, in the multi-tiered interconnect in the illustrative embodiment, there may be as many as 57,600 processing elements. The multi-tiered interconnect depicted in FIG. 6 is meant to illustrate an example and is not meant to imply architectural limitation. More or fewer tiers or processing elements may be permitted depending upon the implementation.

Each one of processing elements 612-614 and 622-624 may be a conventional processor or a special purpose processing element. For example, processing element 612 may be a conventional processor while processing element 624 may be an I/O device. Thus, in accordance with an illustrative embodiment, an I/O device, such as processing element 624, for example, may be abstracted from the physical proximity of processing element 612, for example. That is, an I/O device may simply be addressed, even over a distance, rather than having to make a call to a library, call a device driver, pin memory, and so forth.

Figure 7:
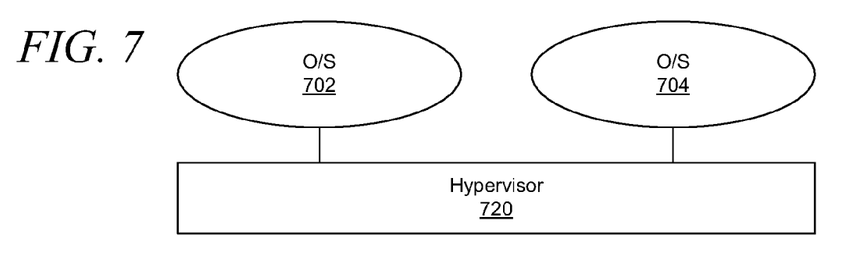
FIG. 7 illustrates abstraction of I/O devices through a hypervisor in accordance with an illustrative embodiment.

FIG. 7 illustrates abstraction of I/O devices through a hypervisor in accordance with an illustrative embodiment. Operating system 702 may make a call to hypervisor 720, which may be addressed to a process running on operating system 704. Hypervisor 720 is a virtualization platform, which may be hardware, software, or a combination of hardware and software. Hypervisor 720 allows multiple operating systems 702, 704 to run on the same data processing system at the same time. Because hypervisor 720 virtualizes, or abstracts, resources within the data processing system, operating system 702 may make calls to operating system 704, but could just as easily make calls to a wide area network (WAN) (not shown).

In accordance with an illustrative embodiment, the heterogeneous processing element model abstracts an I/O device such that communication intended for the I/O device may be packetized and sent over a network. A packet is a formatted block of data carried by a packet mode computer network. Computer communications links that do not support packets, such as traditional point-to-point telecommunications links, simply transmit data as a series of bytes, characters, or bits alone. When data is formatted into a packet, or "packetized," the network can transmit long messages more efficiently and reliably. As an example, transmission control protocol/Internet protocol (TCP/IP) is a suite of network transmission protocol that uses packets.

Figure 8A:
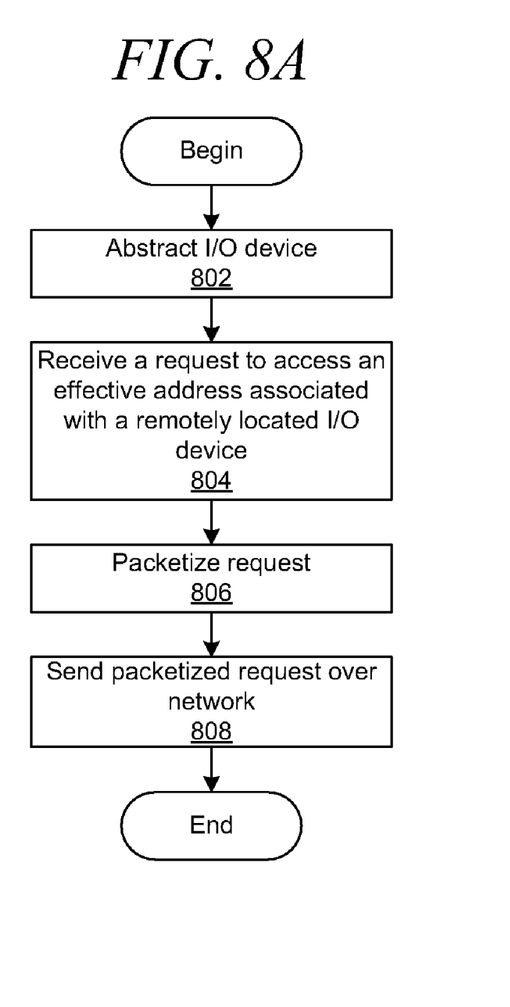
FIGS. 8A and 8B are flowcharts illustrating operation of using packetized communication to accessing a remotely coupled I/O adapter in a heterogeneous processing element model in accordance with an illustrative embodiment.
Figure 8B:
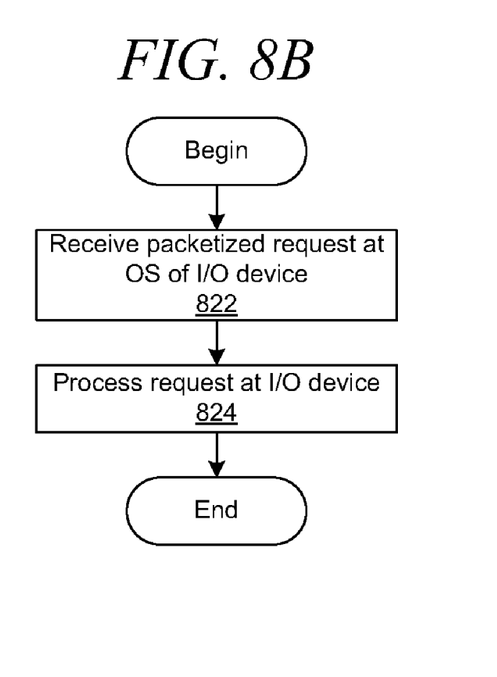

FIGS. 8A and 8B are flowcharts illustrating operation of using packetized communication to accessing a remotely coupled I/O adapter in a heterogeneous processing element model in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 8A, a flowchart is shown illustrating operation of sending packetized communication to a remotely coupled I/O adapter in accordance with an illustrative embodiment. Operation begins, and the hypervisor abstracts the I/O device, which is a special purpose processing element in a remotely located data processing system according to the heterogeneous processing element model of the illustrative embodiments (block 802). Abstracting the remotely located I/O device may include associating an effective address locally to the remotely coupled I/O device. The hypervisor receives a request to access an effective address associated with the remotely located I/O device (block 804), packetizes the request (block 806), and sends the packetized communication over a network (block 808). Thereafter, operation ends.

FIG. 8B is a flowchart that illustrates operation of receiving packetized communication intended for an abstracted I/O device in accordance with an illustrative embodiment. Operation begins, and an operating system of the I/O device receives the packetized request to access the I/O device (block 822). The hypervisor may receive the packetized request and direct the request to the operating system of the I/O device. The I/O device on the receiving end may then process the request to access the I/O device (block 824). Thereafter, operation ends.

Thus, the illustrative embodiments solve the disadvantages of the prior art by providing a heterogeneous processing element model where I/O devices look and act like processors. In order to be treated like a processor, an I/O processing element, or other special purpose processing element, must follow some rules and have some characteristics of a processor, such as address translation, security, interrupt handling, and exception processing, for example. The heterogeneous processing element model puts special purpose processing elements on the same playing field as processors, from a programming perspective, operating system perspective, power perspective, as the processors. The operating system can get work to a security engine, for example, in the same way it does to a processor. The heterogeneous processing element model abstracts an I/O device such that communication intended for the I/O device may be packetized and sent over a network. Thus, communication intended for a remotely located I/O device may be packetized and transmitted over a distance, rather than having to make a call to a library, call a device driver, pin memory, and so forth.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for communicating with a remotely located input/output device, the method comprising:
   receiving, from a user level thread within a first data processing system, a request to access an effective address;
   determining whether the effective address is associated with a remotely located input/output device; and
   in response to the effective address being associated with a remotely located input/output device, packetizing the request and sending the packetized request over a network to the remotely located input/output device.

2. The method of claim 1, wherein the remotely located input/output device is a special purpose processing element connected to an input/output channel controller in a second data processing system and wherein the remotely located input/output device has an assigned effective address range.

3. The method of claim 2, wherein the remotely located input/output device adheres to a set of rules required for a processor.

4. The method of claim 2, wherein the remotely located input/output device comprises an interrupt handler.

5. The method of claim 2, wherein the remotely located input/output device comprises an exception handler.

6. The method of claim 1, wherein receiving the request comprises receiving the request at a virtualization platform within the first data processing system.

7. The method of claim 6, wherein the virtualization platform is a hypervisor.

8. The method of claim 1, further comprising:
   receiving the packetized request at an operating system of the remotely located I/O device; and
   processing the packetized request by the remotely located I/O device.

9. A data processing system, comprising:
   a processor; and
   a memory coupled to the processor, the memory comprising instructions which, when executed by the processor, cause the processor to:
   receive, from a user level thread, a request to access an effective address;
   determine whether the effective address is associated with a remotely located input/output device; and
   in response to the effective address being associated with a remotely located input/output device, packetize the request and send the packetized request over a network to the remotely located input/output device.

10. The data processing system of claim 9, wherein the remotely located input/output device is a special purpose processing element connected to an input/output channel controller in a second data processing system and wherein the remotely located input/output device has an assigned effective address range.

11. The data processing system of claim 10, wherein the remotely located input/output device adheres to a set of rules required for a processor.

12. The data processing system of claim 10, wherein the remotely located input/output device comprises an interrupt handler.

13. The data processing system of claim 10, wherein the remotely located input/output device comprises an exception handler.

14. The data processing system of claim 9, wherein receiving the request comprises receiving the request at a virtualization platform within the first data processing system.

15. The data processing system of claim 14, wherein the virtualization platform is a hypervisor.

16. A computer program product comprising a computer readable storage medium having a computer readable program, wherein the computer readable program, when executed on a computing device, causes the computing device to:
- receive, from a user level thread, a request to access an effective address;
- determine whether the effective address is associated with a remotely located input/output device; and
- in response to the effective address being associated with a remotely located input/output device, packetize the request and send the packetized request over a network to the remotely located input/output device.

17. The computer program product of claim 16, wherein the remotely located input/output device is a special purpose processing element connected to an input/output channel controller in a second data processing system and wherein the remotely located input/output device has an assigned effective address range.

18. The computer program product of claim 17, wherein the remotely located input/output device adheres to a set of rules required for a processor.

19. The computer program product of claim 16, wherein receiving the request comprises receiving the request at a virtualization platform within the first data processing system.

20. The computer program product of claim 19, wherein the virtualization platform is a hypervisor.

* * * * *